April 3, 1934.    G. W. HOPKINS    1,953,408
STORAGE SYSTEM
Filed Dec. 1, 1930    5 Sheets-Sheet 1
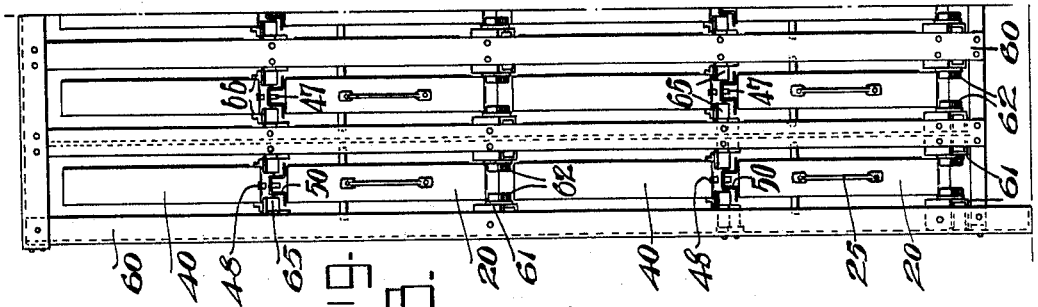
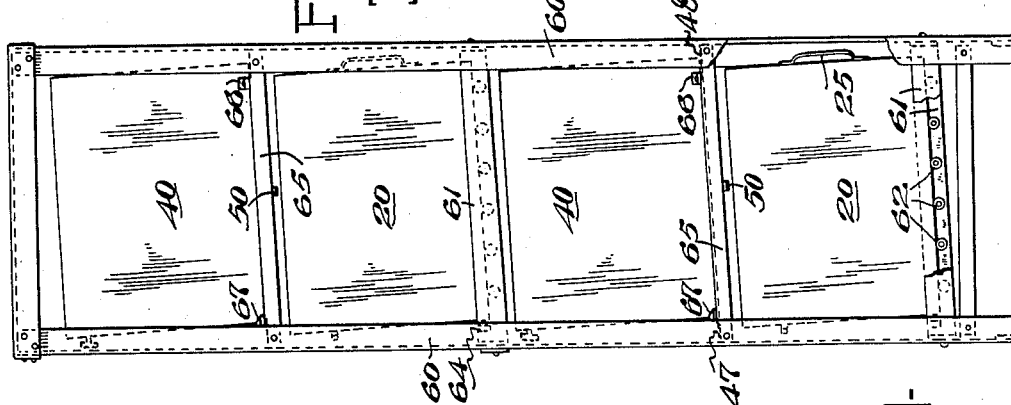
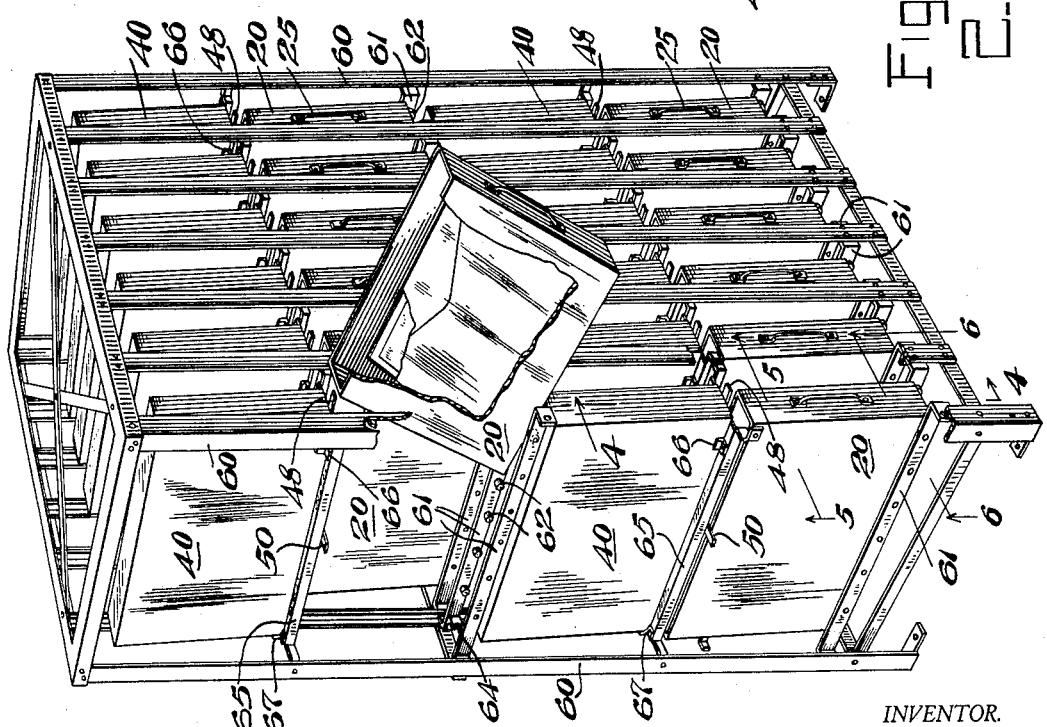
INVENTOR.
George W. Hopkins
BY
ATTORNEYS.

April 3, 1934.   G. W. HOPKINS   1,953,408
STORAGE SYSTEM
Filed Dec. 1, 1930   5 Sheets-Sheet 2
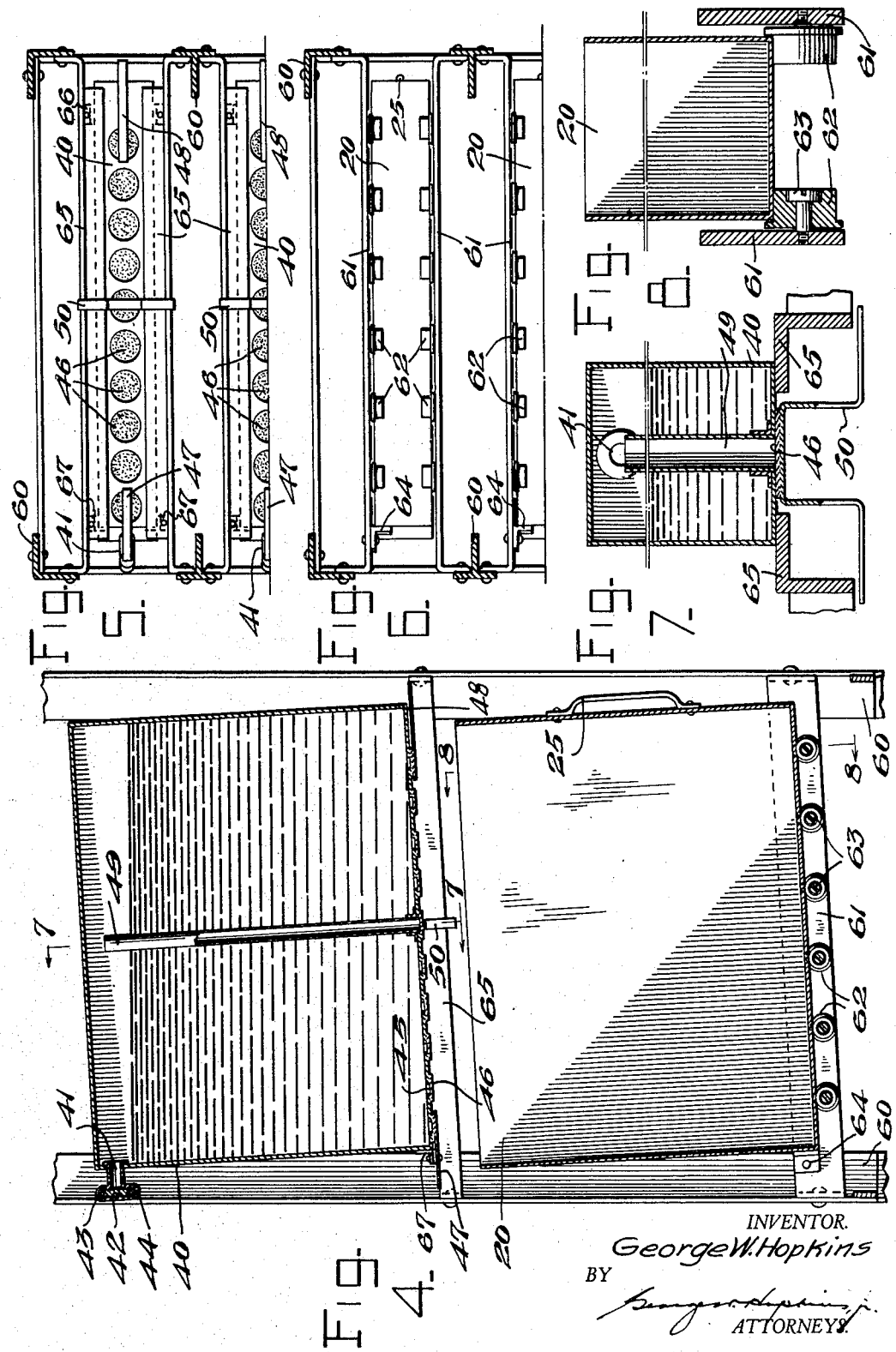
INVENTOR.
George W. Hopkins
BY
ATTORNEYS.

April 3, 1934. G. W. HOPKINS 1,953,408
STORAGE SYSTEM
Filed Dec. 1, 1930 5 Sheets-Sheet 3

INVENTOR.
George W. Hopkins
BY
ATTORNEYS.

INVENTOR.
George W. Hopkins
BY
ATTORNEYS.

Patented Apr. 3, 1934

1,953,408

UNITED STATES PATENT OFFICE 1,953,408

STORAGE SYSTEM

George W. Hopkins, Cleveland, Ohio

Application December 1, 1930, Serial No. 499,265

7 Claims. (Cl. 169—2)

My invention relates to improvements in storage systems: and the objects of my improvement are, first, to provide a system for storing inflammables; second, to provide a system for storing inflammables which includes fire-extinguishing and fire-preventing means; third, to provide containers for inflammables with individual fire-extinguishing and fire-preventing means.

*Description of figures*

Figs. 1 to 8 disclose a device in which my invention is embodied.

Fig. 1 is a perspective view of the device.

Fig. 2 is a side elevation thereof.

Fig. 3 is a front elevation.

Fig. 4 is a sectional view on the line 4—4 of Fig. 1.

Fig. 5 is a view from the line 5—5 of Fig. 1 showing the under side of an extinguisher unit.

Fig. 6 is a view from the line 6—6 of Fig. 1 showing the under side of a container and the supporting means thereof.

Fig. 7 is a sectional view through an extinguisher unit on line 7—7 of Fig. 4.

Fig. 8 is a sectional view through a container on line 8—8 of Fig. 4.

Fig. 9 is a view taken after the manner of Fig. 4 with parts broken away.

Fig. 10 is a front elevation with parts broken away.

*Description of devices*

Figure 9:
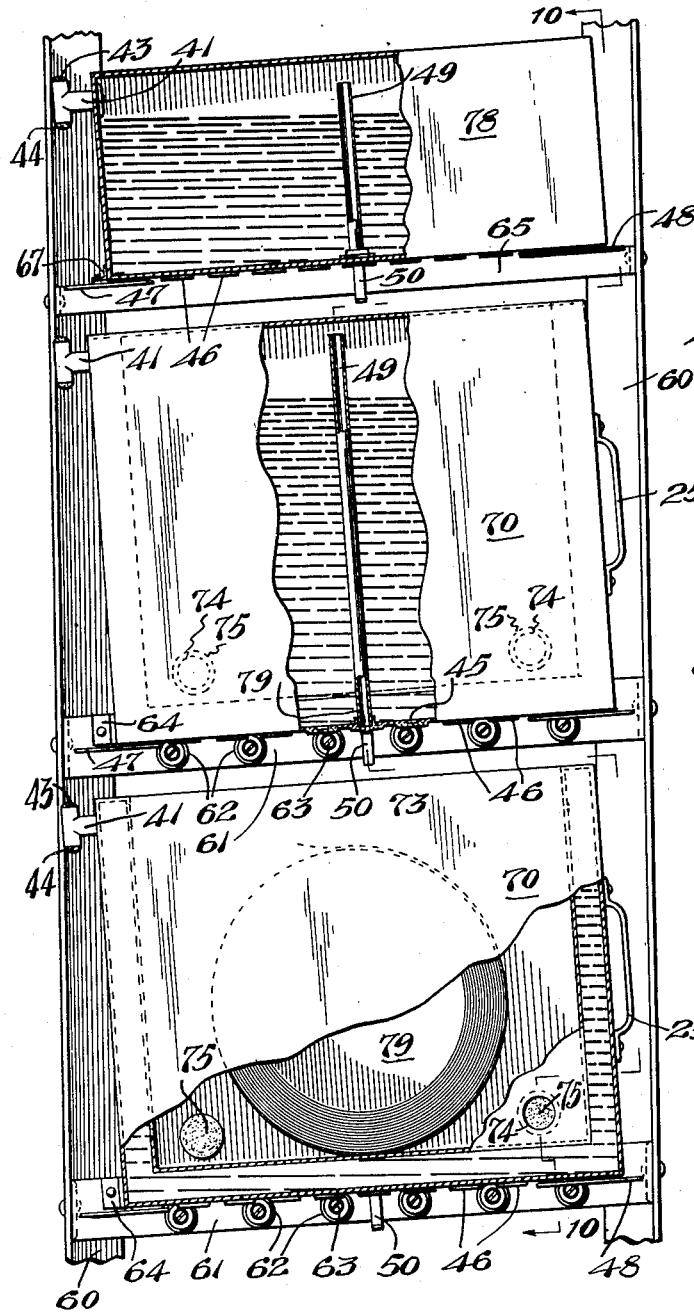
Figs. 9 and 10 disclose another embodiment of my invention.

The devices here disclosed for purposes of illustration are particularly intended for storing inflammables, such as films. It is to be understood, however, that these devices are adaptable to storing other materials and articles to protect them from fire, without departing from the spirit of my invention.

Referring for an illustration of the preferred form to Figs. 1 to 8, film containers 20 and extinguisher units 40 are arranged as shown with an extinguisher unit 40 above each film container 20.

Container 20 is formed of sheet metal or other suitable material with welded seams and should be substantially water tight, as will appear. The container is open at the top for admission of the extinguishing agent from the unit 40 above in case the films in the container are threatened by fire.

Unit 40 is adapted to receive any suitable fire extinguishing medium, such as a non-inflammable fluid or a heavy non-inflammable gas through filler pipe 41. The fire-extinguishing medium can be stored in the unit under pressure, the filler pipe opening being closed by screw plug 42 threaded in the vertical passage and sealed at the ends 43, 44. With plug 42 sealed, as shown, the contents are completely sealed in the unit which comprises a container similar to container 20, except that it is closed at the top and has apertures 45 covered and sealed by fusible discs 46, which are composed of an alloy or other suitable material of low melting point such as wax. If for any reason the fuse discs 46 should be subjected to excessive heat, due to fire in the container below or elsewhere, the discs melt and liberate the extinguishing medium which empties through the apertures 45 into the container 20 below, thereby extinguishing or preventing fire in that container. Fused in the end discs are metal strips 47, 48 which are designed to readily conduct heat to the discs to cause them to melt and are effective where the source of heat is not in the container below but external thereto. To insure discharge of the extinguishers, a vent pipe 49 is connected with the central aperture 45, its upper, open end being located near the top of the unit. The fusible disc covering the central aperture 45 has a conductor strip 50 attached to it and extending outwardly beyond the sides of the unit for the same purpose as strips 47, 48. When the disc 46 covering central aperture 45 melts, air is admitted to the top of the unit through pipe 49.

The containers and extinguisher units are supported in an open framework as will readily appear, particularly from Fig. 1. This framework includes uprights 60 and inclined bars 61 having flanged ends secured to the uprights 60. Flanged rollers 62 are rotatably mounted on screws 63 threaded in bars 61. Container 20 rests upon rollers 62 which facilitate drawing the container out of the framework by handle 25 for access to the interior. The container has a tendency to return to its proper position under the extinguisher unit due to the inclination of the bars 61. To further position the container, stops 64 are fastened to bars 61.

Extinguisher units 40 are directly supported on inclined angle bars 65 secured at their ends to uprights 60 and are positioned on bars 65 by brackets 66, 67 fastened to bars 65. Units 40 are readily removable from the supporting framework for replacement by newly charged units or for recharging.

Figure 10:
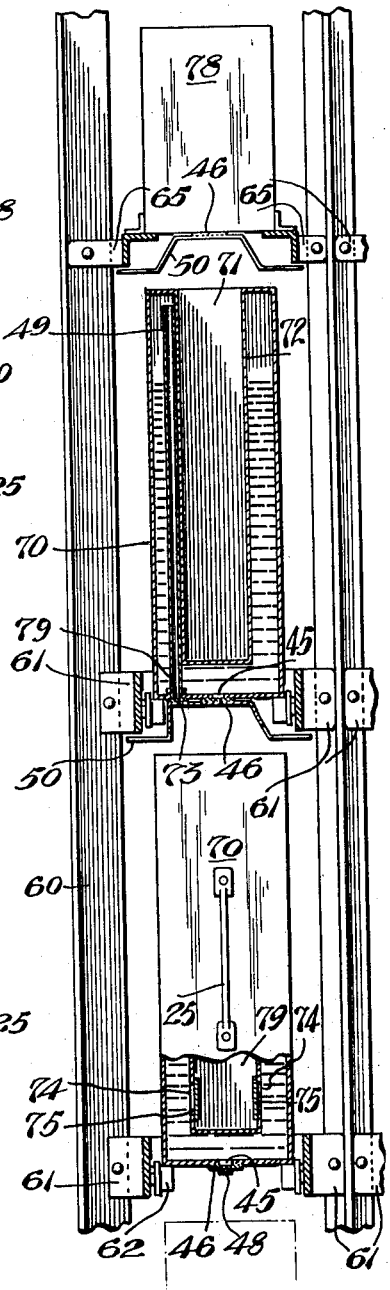

In the embodiment illustrated in Figs. 9 and 10, a single unit is adapted to contain both films and fire-extinguishing medium and it consists essentially of a container within a container.

The outer container 70 is similar in construction to the unit 40, being provided with apertures 45, fusible discs 46, conductor strips 47, 48, 50, and filler pipe 41.

The top of outer container 70 has aperture 71 to receive inner container 72, the upper edges of which are secured to the edges of the aperture to provide a sealed enclosure for the extinguishing medium between containers 70 and 72. Vent pipe 49 is located at one side as shown in Fig. 10, and is connected with a separate aperture 79 covered by fusible disc 73 to which conductor strip 50 is also secured.

The sides of container 72 are apertured at 74 and the apertures are covered by fusible discs 75.

The units 70 are substantially identical and are placed one above the other, being supported on rollers in the same manner as containers 20. In the top row are extinguisher units 78 which are similar to units 40 except that they are of less capacity.

In case of fire in the lower container 72 where for illustration a roll of moving picture film 79 is shown, either the discs 75 in the lower container 72 or the discs 46 in the container 70 above, or both, will melt, admitting the extinguishing medium through aperture 74 or emptying it from apertures 45 into lower container 72.

In case of fire in upper container 72, discs 75 in the upper container or discs 46 in unit 78, or both, will melt, filling upper container 72 with extinguishing medium.

Figure 11:
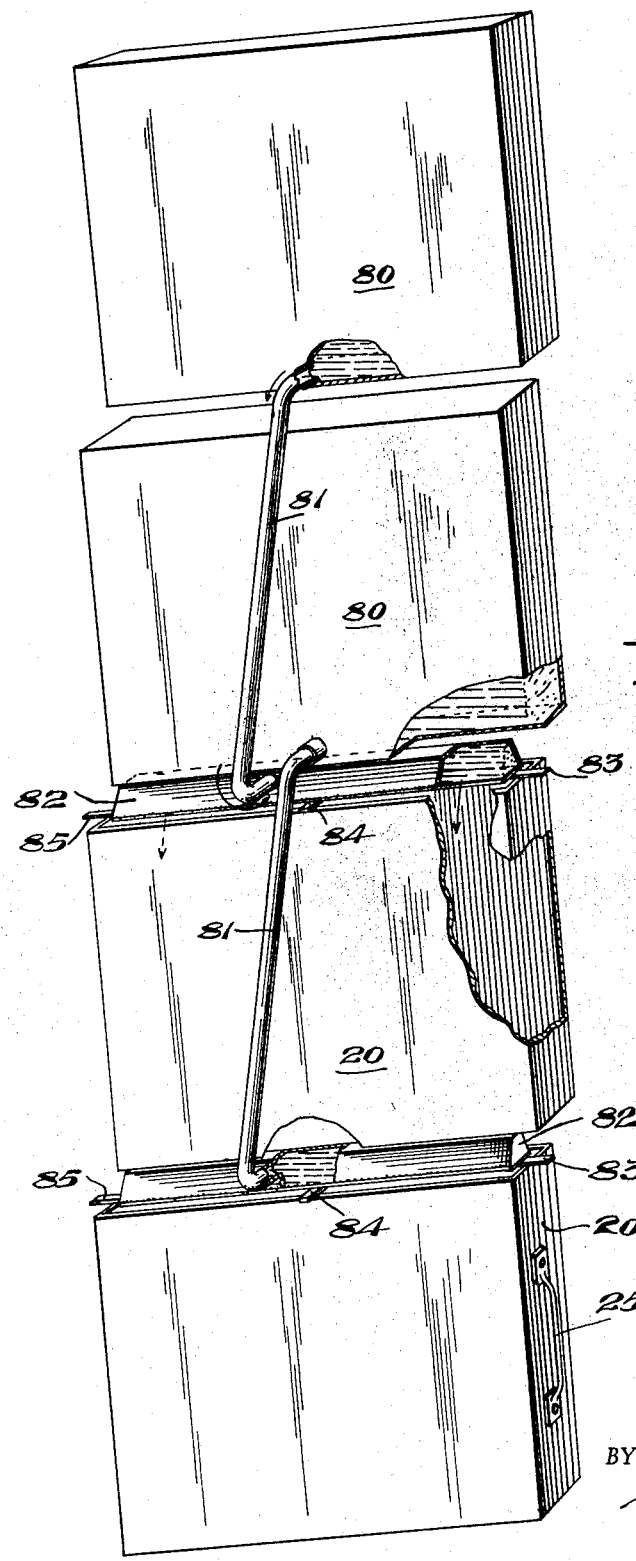
Fig. 11 is a perspective view of a third embodiment of my invention with parts broken away.

In the embodiment illustrated in Fig. 11, containers 20 are placed together and their corresponding extinguisher units 80 are placed together above with pipes 81 leading down to outlets 82 over the top of each container 20. Outlets 82 are suitably sealed with fusible material to which are attached conductor strips 83, 84, 85.

Figure 12:
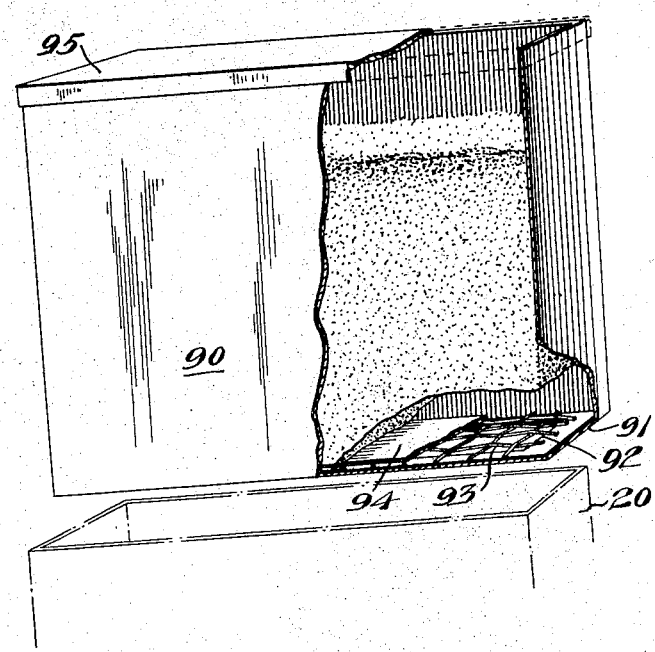
Fig. 12 is a perspective view of a fourth embodiment of my invention with parts broken away.

In the embodiment illustrated in Fig. 12 is shown an extinguisher unit 90 particularly adapted to store an extinguishing medium, which is solid matter, such as sand, or a powdered noninflammable substance. Units 90 are adapted for alternative use in the arrangement illustrated in Figs. 1 to 8 in place of units 40. The bottom 91 has a single large aperture 92 over which is placed a wire screen 93 of sufficiently course mesh to permit free passage of the sand. The screen 93 is covered by paper or a sheet 94 of any material which will readily break down under heat, but will normally support the sand. The container is covered with a removable lid 95 for access to the interior and to prevent absorption of moisture by the contents.

In case of fire, sheet 94 will disintegrate and the sand will break through and pour down through screen 93 into film container 20.

The bottom of unit 90 may also be constructed in the same manner as the bottom of unit 40, that is, with apertures 45 and fusible discs 46.

Figure 13:
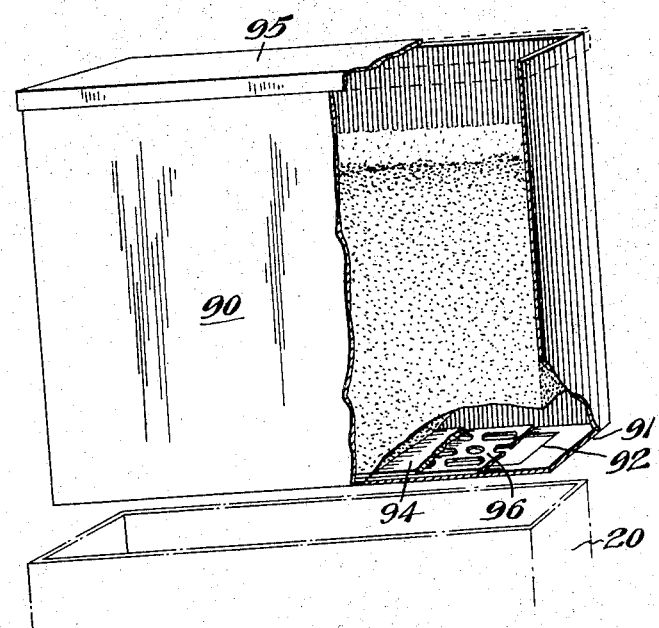
Fig. 13 is a perspective view of a fifth embodiment of my invention with parts broken away.

In Fig. 13 is shown another means of closing aperture 92. In this case an apertured sheet of metal 96 is employed instead of screen 93.

It will appear that a most effective system of fireproof storage has been provided. A separate, individual extinguisher unit has been provided for each container in which inflammable materials are stored which will quickly and positively fill the container with an extinguishing medium as soon as the contents are threatened with fire. By this system, only those films which are endangered are flooded, all others are untouched. A large number of fuses are employed so that the system has a multitude of heat sensitive spots located at points which must be protected, instead of a few isolated fuses, as in other systems. The system is readily adaptable to the use of every conceivable kind of extinguishing medium.

I, therefore, claim as my invention:

1. A storage system comprising a container for inflammables and a second container for a fire-extinguishing medium, said containers being entirely separate units, fusible means normally preventing contact of said medium with said inflammables, said means being exposed to said inflammables, and means for conducting heat to said fusible means extending into the atmosphere outside the container of said inflammables.

2. In a storage system, a first container for a fire-extinguishing medium, a second container for inflammables located within said first container and having an aperture closed by a seal fusible at a predetermined temperature inside said second container; and a third container for fire-extinguishing medium above said second container and having an aperture closed by a seal fusible at a predetermined temperature outside said second container.

3. A fire extinguisher comprising, a closed container for a fire-extinguishing medium, one side of said container having an outlet for said medium, means normally operative to close said outlet but operative to open said outlet in case of fire, said container having an aperture to admit air, said aperture being in the same side of said container as said outlet, a pipe within and rigidly attached to said container, said pipe having one end communicative with said aperture and the other end open adjacent the top of said container, and means normally operative to close said aperture but operative to open said aperture to admit air to the top of said container to facilitate passage of said fire-extinguishing medium through said outlet in case of fire.

4. In a fire protection system, a structure for filing having horizontal and vertical rows of compartments, drawers sliding in said compartments, each drawer having an opening at the top which is exposed when said drawer is drawn out of said structure so that photographic films may be placed in or removed from said drawer, fire extinguishers in said structure above said compartments, one extinguisher for each compartment, each extinguisher having a temperature-responsive device in its bottom which is located above the opening in the drawer beneath when the drawer is pushed into its compartment, said device operating to release a fire-extinguishing medium into the drawer in case of fire.

5. In a fire protection system, a structure for filing having horizontal and vertical rows of compartments, drawers sliding in said compartments, each drawer having an opening at the top which is exposed when said drawer is drawn out of said structure so that photographic films may be placed in or removed from said drawer, means in each compartment for supporting one of said drawers, said supporting means being arranged on an incline so that the drawer will slide into place in said compartment under the action of gravity, fire extinguishers in said structure above said compartments, one extinguisher for each compartment, each extinguisher having a temperature-responsive device in its bottom which is located above the opening in the drawer beneath when the drawer has slid down the inclined supporting means into place in said compartment, said device operating to release a fire-extinguishing medium into the drawer in case of fire.

6. In a fire protection system, a structure for filing having horizontal and vertical rows of compartments, drawers sliding in said compartments, there being vertical air passages between vertical rows of said drawers when said drawers are in place, each drawer having an opening at the top which is exposed when said drawer is drawn out of said structure so that photographic films may be placed in or removed from said drawer, fire extinguishers in said structure above said compartments, one extinguisher for each compartment, each extinguisher having a temperature-responsive device in its bottom which is located above the opening in the drawer beneath when the drawer is pushed into its compartment, said device operating to release a fire-extingushing medium into the drawer in case of fire in said drawer, each extinguisher having a temperature-responsive device, a part of which extends into the vertical air passage adjacent the drawer, said device being located above said opening in the drawer beneath, said device operating to release a fire-extinguishing medium into the drawer in case the films in the drawer are endangered by excessive heat outside the drawer.

7. In a fire protection system, a structure having a tier of compartments, containers for inflammables in said compartments, air being free to circulate through said tier of compartments when said containers are in said compartments, a container of fire-extinguishing medium adjacent each container for inflammables, and a temperature-responsive device in each of said containers of fire-extinguishing medium operative to release said medium into the associated container for inflammables in case of excessive heat in the container, said device having a part exposed to the air passing said associated container for inflammables which renders the device responsive to excessive heat outside the container.

GEORGE W. HOPKINS.